(12) United States Patent
Perrone

(10) Patent No.: US 6,333,995 B1
(45) Date of Patent: Dec. 25, 2001

(54) SYSTEM AND METHODS FOR PROVIDING ROBUST KEYWORD SELECTION IN A PERSONAL DIGITAL NOTEPAD

(75) Inventor: Michael P. Perrone, Yorktown, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,147

(22) Filed: Jan. 29, 1999

(51) Int. Cl.[7] ....................................................... G06K 9/00
(52) U.S. Cl. ........................ 382/187; 382/188; 382/203; 382/228
(58) Field of Search ..................................... 382/186–189, 382/177–180, 203, 311, 224–225, 270, 272; 707/530

(56) References Cited

U.S. PATENT DOCUMENTS

| | | | |
|---|---|---|---|
| 5,566,248 | * 10/1996 | Ulrich | 382/187 |
| 5,613,019 | * 3/1997 | Altman et al. | 382/311 |
| 5,862,256 | * 1/1999 | Zetts et al. | 382/187 |
| 6,021,218 | * 2/2000 | Capps et al. | 382/187 |
| 6,064,765 | * 5/2000 | Hirayama | 382/189 |

\* cited by examiner

Primary Examiner—Matthew C. Bella
Assistant Examiner—Gregory Desire
(74) Attorney, Agent, or Firm—F. Chau & Associates, LLP

(57) ABSTRACT

Keyword selection methods for use with handwriting recording devices such as a personal digital notepad (PDN) which provide robust keyword selection by making stroke membership and selection more flexible and, therefore, less prone user error/variability. In one aspect of the present invention, a method for selecting a keyword in a handwriting recording device comprises the steps of invoking a keyword selection mode writing bounding strokes around handwritten strokes selected by a user for designation as a keyword; defining a bounding region as the area contained within the bounding strokes; and determining keyword membership of a recorded stroke based on a relation between the recorded stroke and the defined bounding region. Keyword membership may be determined by including only those recorded strokes which fall entirely within the bounding region. In another aspect, keyword membership is determined by including only those strokes for which the ratio of the length of the stroke inside the bounding region to the total length of the stroke is larger than some predetermined or user-specified threshold. In another aspect, keyword membership can be implemented to include only those recorded strokes having a beginning, an end, or a beginning and end included within the bounding region. In yet another aspect, the keyword membership is implemented by including or excluding as a keyword member a stroke having a cost factor which exceeds a prespecified threshold, wherein the cost factor is based on a distance from the bounding region of a portion of a stroke that is outside of the bounding region and the percentage of the stroke length which is outside the bounding region.

20 Claims, 5 Drawing Sheets

SYSTEM AND METHODS FOR PROVIDING ROBUST KEYWORD SELECTION IN A PERSONAL DIGITAL NOTEPAD

BACKGROUND

1. Technical Field

The present invention relates generally to handwriting recording devices for real-time digitization of handwritten text and, more particularly, to system and methods for selecting keywords in a handwriting recording device.

2. Description of Related Art

There are a variety of handwriting recording devices which digitize and electronically capture handwritten text in real-time as the text is written. Typically, these conventional handwriting recording devices utilize a digitizing tablet in conjunction with an electronic stylus (i.e., pen) to record handwriting data. The digitizing tablet generates positional data representing the coordinates of the electronic stylus by detecting, for example, RF (radio frequency) signal emissions generated by the stylus as a user applies the stylus to the surface of the tablet (e.g., when the user is writing on or near the surface of the tablet).

One type of handwriting recording device is a personal digital notepad (PDN) device. The PDN device includes an electronic stylus having an inking tip which allows the user to write on a piece of paper placed over the digitizing tablet while recording handwriting strokes (positional data). The stylus typically includes a pressure sensor which generates a "pen down" signal when the stylus is in contact with the surface of the digitizing tablet. This signal is usually conveyed to the digitizing tablet via a dedicated line or through a secondary RF emission. Accordingly, by monitoring the pen down signal and the path of the radio emission of the stylus as it move across the radio sensitive grid, the digitizing tablet may generate a data stream representing the pen strokes which comprise written text on, or in proximity to, the surface of the digitizing tablet. The term "stroke" used herein refers to a group of handwriting data which is recorded between a "pen-down" signal and a "pen-up" signal.

One embodiment of a PDN device is disclosed in U.S. patent application Ser. No. 08/747,735 entitled: "Methods, Systems and Products Pertaining To A Digitizer For Use In Paper Based Record Making Systems" filed on Nov. 12, 1996, the disclosure of which is incorporated herein by reference. One currently available embodiment of this PDN device is marketed by the A. T. Cross Company and sold under the name CROSSPAD™. The CROSSPAD allows a user to record handwritten information on a standard paper notepad and simultaneously record an electronic carbon copy of the writing.

One novel feature of the CROSSPAD is its ability to record user defined keywords while a user is writing on the device. A keyword can be one word or a group of words which are selected by the user when producing a handwritten record to represent key concepts or ideas for a given handwritten paragraph or page. In particular, a keyword comprises one or more recorded strokes which correspond to the handwritten text selected by the user and are electronically tagged as a single unit. The strokes comprising the keyword are subsequently converted into a text representation of the ink using handwritten recognition technology.

Specifically, the CROSSPAD is currently configured to define a keyword in the following manner. After the user is done writing on the writing medium associated with the PDN, the user actuates a designated switch, button or menu option on the PDN to invoke a "keyword mode." While in the keyword mode, the user selects a keyword by drawing "bounding strokes" around the handwritten strokes comprising the desired keyword. The bounding strokes may take the form of a circle, a box, or any other shape drawn by the user to delineate an area encompassing the desired (keyword) handwriting strokes. For instance, as shown in FIG. 1, a bounding stroke "b" (in the shape of an ellipse) is drawn around the handwritten word "jumps" on page P. As further illustrated in FIG. 1, the bounding stroke "b" is processed by the PDN to detect the extremities of the bounding stroke "b", i.e., the maximum X and Y coordinates (i.e., Xmax and Ymax) and the minimum X and Y coordinates (i.e., Xmin and Ymin) to generate a "bounding box" (denoted as "B") through which the detected coordinates extend. All recorded strokes having coordinates which fall within the "bounding box" area are used to define the keyword.

There are various disadvantages to the current keyword selection algorithm. For instance, the user may not fully encircle a handwritten stroke. Consequently, it is possible that some or even all of the handwritten strokes that the user desires to select as a keyword will not be included in the keyword. In addition, even if the bounding stroke "b" encloses the desired handwritten strokes, the current algorithm for generating the bounding box "B" (area) may cause the keyword members to include recorded strokes that are outside the actual bounding stroke "b" (i.e., in the areas denoted as "a" in FIG. 1) made by the user. These problems can result in user inconvenience and reduce the usability of the PDN with respect to keyword selection.

SUMMARY

The present application is directed to a system and methods for providing robust keyword selection in a handwriting recording device such as a personal digital notepad (PDN) device, which are less prone to user error/variability during user selection of desired keywords. Particularly, novel keyword selection methods for use with handwriting recording devices render user selection of keyword strokes more robust and less prone to user error/variability by making stroke membership and selection more flexible.

In one aspect of the present invention, a method for selecting a keyword in a handwriting recording device having an electronic inking stylus and a digitizing tablet associated therewith, wherein the device records stroke data representing handwritten strokes concurrently produced on a writing medium placed over the digitizing tablet using the electronic inking stylus, comprises the following steps: invoking a keyword selection mode; writing bounding strokes around handwritten strokes selected by a user for designation as a keyword; defining a bounding region as the area contained within the bounding strokes; and determining keyword membership of a recorded stroke based on a relation between the recorded stroke and the defined bounding region.

In another aspect of the present invention, keyword membership is determined by including only those recorded strokes which fall entirely within the bounding region.

In yet another aspect of the present invention, keyword membership is determined by including only those strokes for which the ratio of the length of the stroke inside the bounding region to the total length of the stroke is larger than some predetermined or user-specified threshold.

In another aspect of the present invention, the keyword membership determination process can be implemented to include only those recorded strokes having a beginning, an end, or a beginning and end included within the bounding region, wherein the "beginning" of a stroke refers to the first recorded position of the stroke and the "end" of a stroke refers to the last recorded position of the stroke.

In yet another aspect of the present invention, the keyword membership determination process is implemented by including or excluding as a keyword member a stroke having a cost factor which exceeds a prespecified threshold, wherein the cost factor is based on a distance from the bounding region of a portion of a stroke that is outside of the bounding region and the percentage of the stroke length which is outside the bounding region.

These and other aspects, features and advantages of the present invention will be described and become apparent from the following detailed description of preferred embodiments, which is to be read in connection with the accompanying drawings.

DETAILED DESCRIPTION OF PREFERRED EMBODIMENTS

It is to be understood that the present invention may be implemented in any conventional handwriting recording device such as a PDN (or other similar devices). Notwithstanding that present invention may be employed in various devices, for purposes of illustration, the present invention will be described in relation to the personal digital notepad (PDN) device disclosed in the above incorporated U.S. Ser. No. 08/747,735 (and one of its currently available embodiments, the CROSSPAD).

Figure 1:
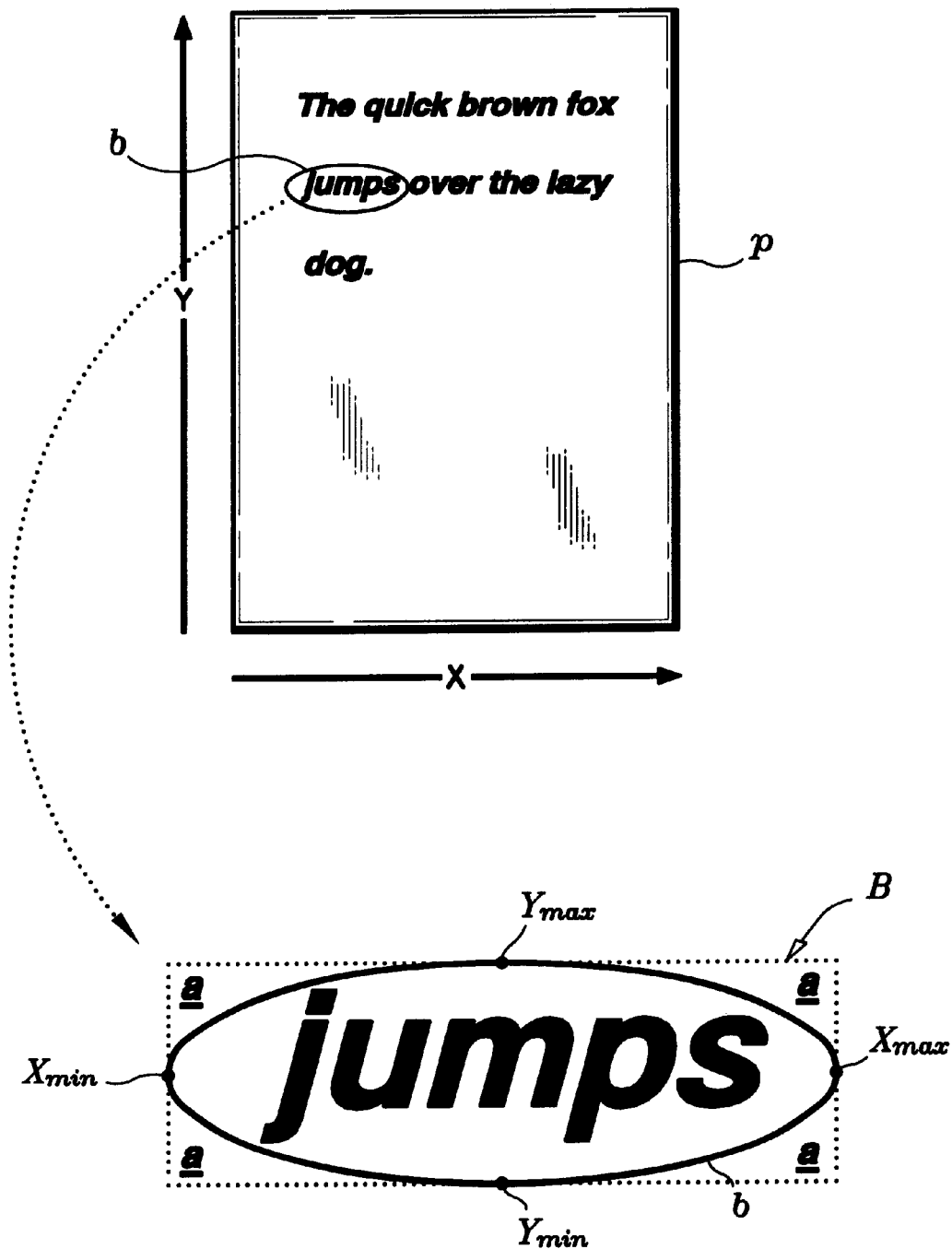
FIG. 1 is a diagram illustrating a conventional keyword selection method.
Figure 2:
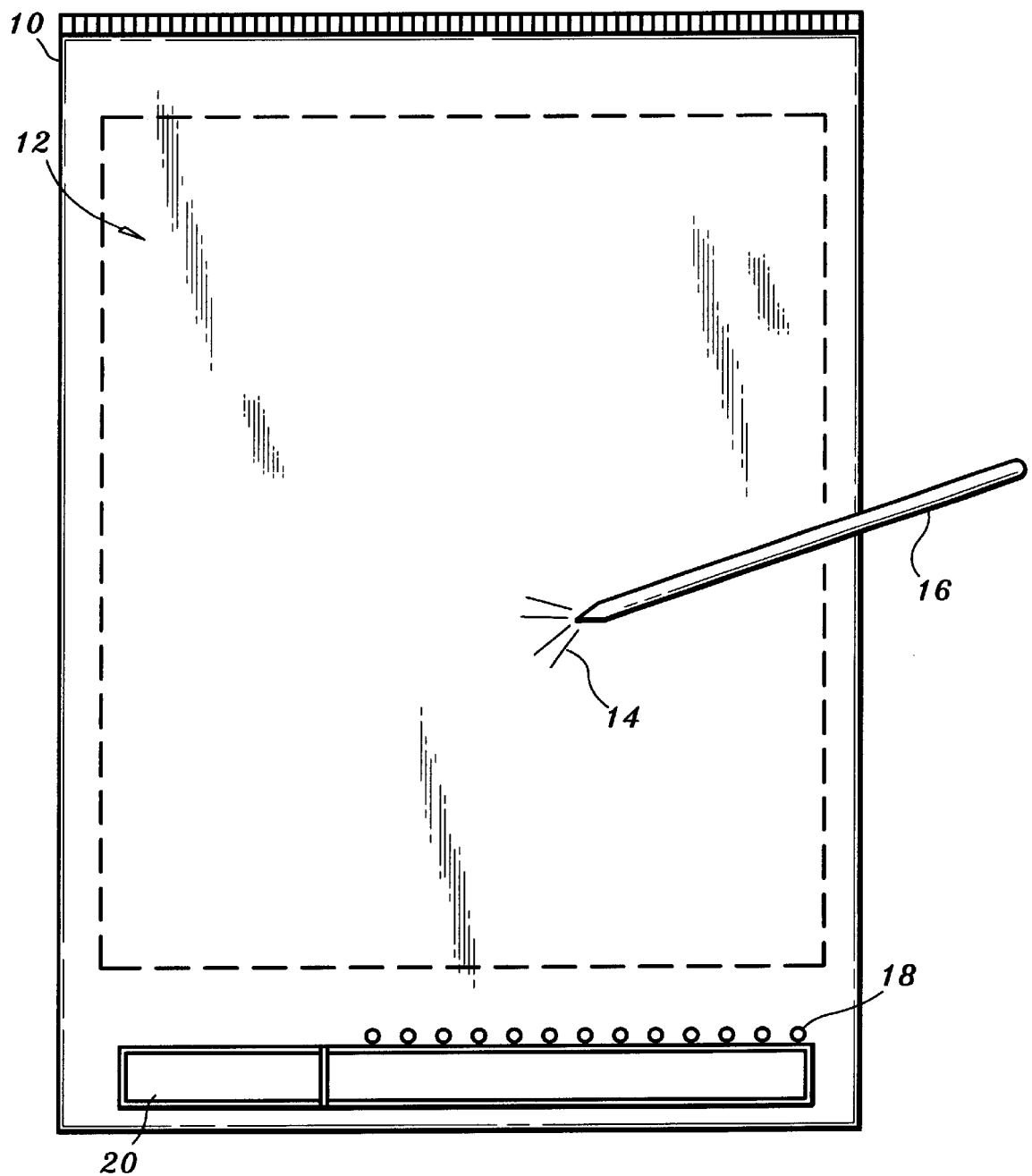
FIG. 2 is a diagram illustrating a handwriting recording device in which the present invention may be implemented.

Referring now to FIG. 2, a diagram illustrates an embodiment of a PDN device in which the present invention may be implemented. The PDN device includes a housing 10 having an handwriting recording area 12 (i.e., active area) which overlies a digitizing tablet (the outline of which is indicated by the broken lines). The PDN may be designed in one of a variety of sizes to accommodate a given paper size (form factor). For instance, the digitizing tablet may be provided such that a portion of the active area 12 has a form factor to match, e.g., a standard paper size (8.5×11 inches) or standard check book size.

The digitizing tablet receives electromagnetic signals 14 from an RF coupled inking stylus 16 as the user writes on a piece of paper (placed over the digitizing tablet active area 12) with the inking stylus. A data stream representing the handwriting strokes produced in ink on the paper is generated by the digitizing tablet. As a given page is filled with handwritten strokes, the data stream is recorded, effectively creating a record of the entire page of handwritten strokes in chronological order. In this manner, the PDN generates an electronic carbon copy of handwritten text and stores the recorded data stream. The handwriting data may be stored in any suitable conventional format such as a bitmap image or as a sequence of X-Y coordinates which represent the location of a pen writing tip on the digitizing tablet at successive points in time. The recorded handwriting data may subsequently be downloaded to another computer system for decoding and recognizing the recorded handwriting data.

The digitizing tablet may also include several "soft buttons." A soft button in an area within the active area 12 of the digitizing tablet which is predefined to indicate a specific input value when stroke information is detected within the soft button area. In the illustrated embodiment, a plurality of soft buttons 18 are provided in a horizontal row near the bottom of the PDN. The soft buttons 18 may be located in any active portion of the digitizing tablet, and their locations may be designated by default or through a user customization procedure. The function of the soft button may be indicated with an icon or legend. When pen stroke data is detected as occurring within the predefined area of the soft button, the routine associated with the soft button event is automatically executed by the system. The PDN device also includes a display screen 20 (LCD) which is used, for example, to display user prompts and status information.

Figure 3:
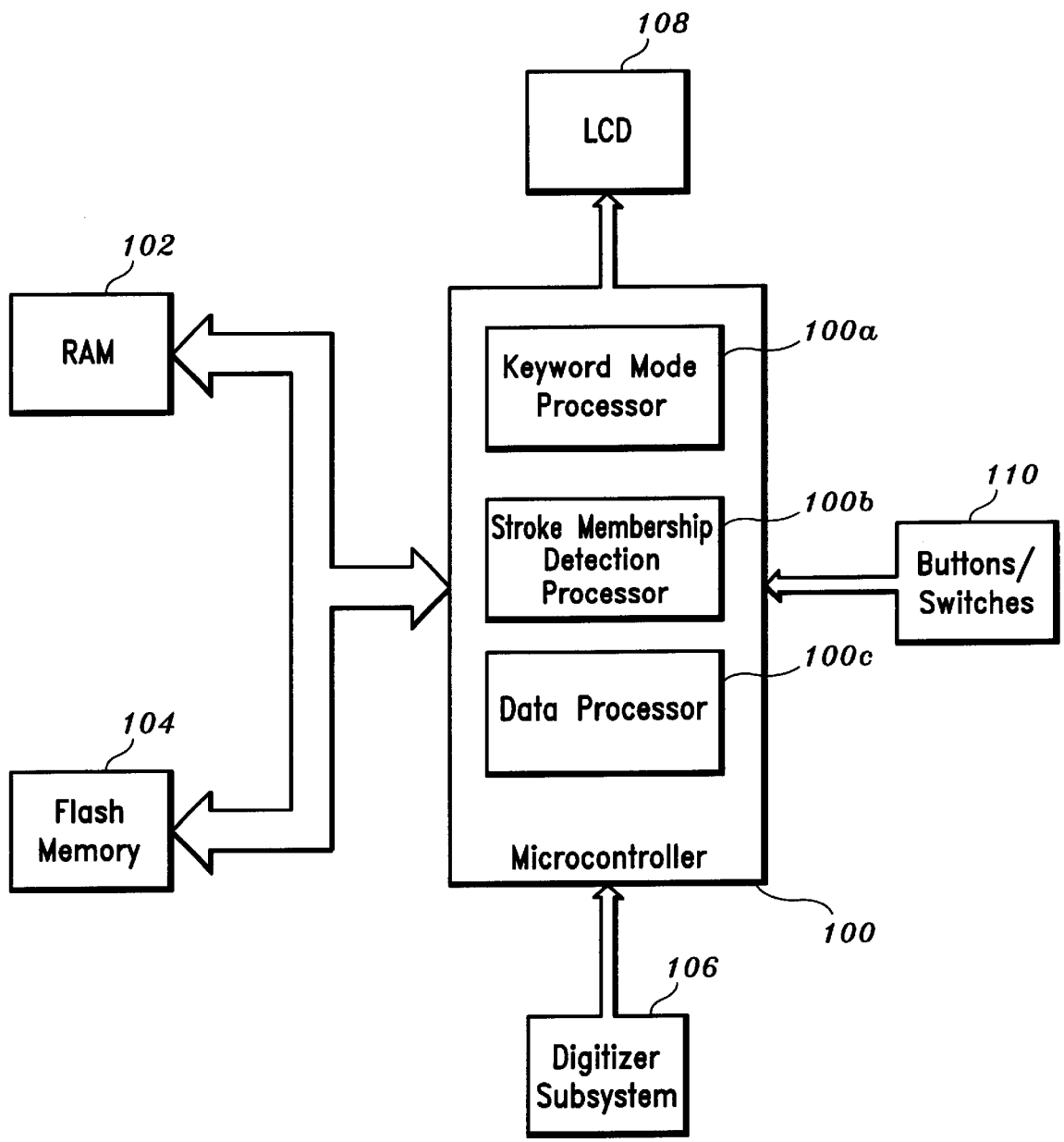
FIG. 3 is a general block diagram of a system which may be implemented in the device of FIG. 2 for providing keyword selection in accordance with one embodiment of the present invention.

Referring now to FIG. 3, a block diagram illustrates a system for keyword selection in accordance with one embodiment of the present invention, which can be implemented in the PDN device of FIG. 2. It is to be noted that the system depicted in FIG. 3 is a general representation of elements that are used for implementing the present invention. A microcontroller 100 controls the overall operation of the system. The system includes volatile memory 102 (e.g., random access memory (RAM)) and nonvolatile memory 104 (e.g., flash memory), which are connected to the microcontroller 100. A digitizer subsystem 106 includes appropriate digitizing hardware and an electromagnetic sensor (not shown) for detecting and collecting stroke and event data under the control of microcontroller 100.

A plurality of buttons/switches 110 (e.g. soft buttons and/or hardwired buttons and switches) are employed in accordance with the present invention for accessing and implementing one the various keyword selection modes (described below in detail). It is to be appreciated that the system of FIG. 2 may be configured in several ways. For instance, the system can be configured such that only one of the various keyword selection methods described herein may be invoked. In this situation, only one keyword selection routine would be programmed in the system (i.e., the user would not be allowed to select one of many keyword selection modes displayed in the "keyword selection mode" menu). The keyword routine could then be directly accessed by actuating a designated keyword button. Alternatively, the system could be configured such that the user can predesignate one of many keyword selection methods prior to using the device, in which case the preselected keyword routine would be utilized when the user subsequently invokes the keyword mode. The system can also be configured to allow the user to dynamically select one of a plurality of keyword selection modes by actuating a corresponding soft button to display a "keyword selection mode" menu on the LCD 108, whereby the user can select a desired keyword mode by toggling a designated button or switch.

It is to be understood that the keyword selection modes described herein in accordance with the present invention may be implemented by the microcontroller 100 under the control of appropriate software or microinstruction code. For instance, a keyword selection mode processor 100a invokes the corresponding keyword selection routines selected (via a menu or button) by the user. A stroke membership detection module 100b processes bounding stroke data in accordance with the user-selected keyword selection mode to determine the strokes that are members of the user selected keyword. In addition, a data processing module 100c includes microinstructions in accordance with the present invention for generating a digital record of the data stream generated by the digitizing subsystem 106 and tagging the keyword event identifiers to the strokes selected as keywords by the user. The digitized record is stored in memory 104 as the data stream is produced.

Figure 4:
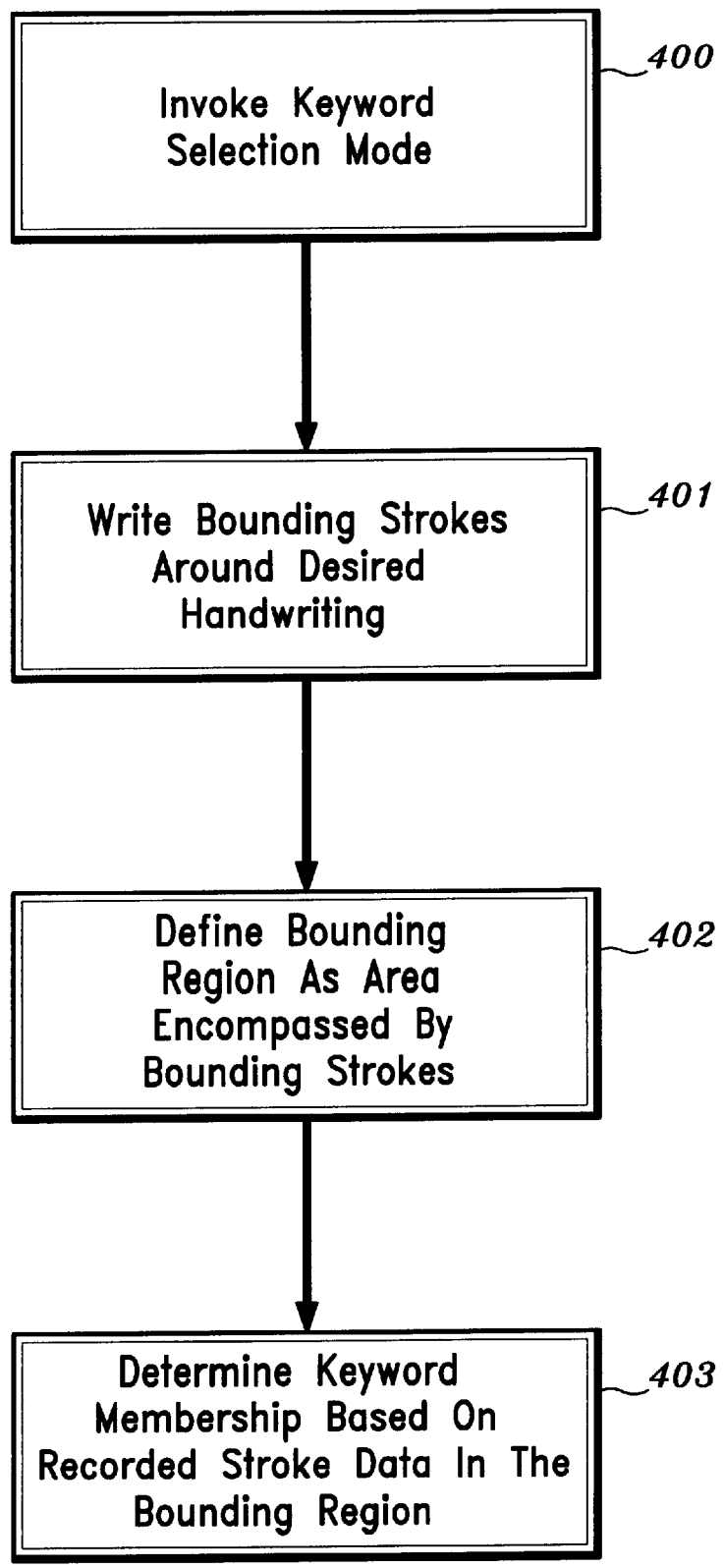
FIG. 4 is a flow diagram of a keyword selection method in accordance with one aspect of the present invention.

Referring now to FIG. 4, a diagram illustrates a keyword selection method in accordance with one aspect of the present invention. Initially, the user will invoke the keyword selection mode (step 400). It is to be understood that (as explained in detail above) the keyword selection mode can be invoked either from a list of available keyword modes displayed in the keyword selection mode menu on the LCD (predesignated or dynamic selection) or by actuating a designated button to select the only available keyword selection mode. The user will then draw bounding strokes around the handwritten text (step 401). It is to be appreciated that the bounding strokes may comprise any shape such as a circle, box, ellipse, triangle, etc. Next, a bounding region will be defined as the area contained within the bounding strokes (step 402). Specifically, the recorded positional data associated with the bounding strokes will be used to define the outer extremities (perimeter) of the bounding region, and the bounding region will be defined to include each of the positional coordinates included within the perimeter of the bounding region. Then, keyword membership will be determined based on a relation between a recorded stroke and the defined bounding region in accordance with the selected keyword mode (step 403).

Figure 5:
FIG. 5 is a diagram illustrating a method for determining keyword membership in accordance with one aspect of the present invention.

It is to be appreciated that the keyword membership determination process (step 403) can be performed in accordance with the present invention in various ways. In one aspect of the present invention, keyword membership is determined by including only those recorded strokes which fall entirely within the bounding region ("circle membership"). For example, referring to FIG. 5, the word "jumps" (which is illustrated in cursive form) is included entirely within the bounding stroke "b" but the word "over" is only partially included within the bounding region. In this situation, stroke membership of the bounding region would comprise two strokes: the stroke for the written (cursive) portion of the word "jump"; and the stroke for the dot above the "j" since both strokes are fully included within the bounding region defined by the bounding stroke "b". As stated above, the bounding region could be defined by any arbitrary bounding line such as a circle, a square or an ellipse). In this manner, the stroke comprising the word "over" is partially included within the bounding region and will not be included as a keyword member. Accordingly, this method includes as keyword members only the handwritten strokes desired by the user (and not any other undesired strokes as may be included such as when using the conventional method discussed above).

In another aspect of the present invention, keyword membership is determined by including only those strokes for which the ratio of the length of the stroke inside the bounding region to the total length of the stroke is greater than some predetermined or user-specified threshold ("percent membership"). Since (as described above) the recorded data stream (strokes) contains X-Y coordinates (positional information), the length (L) of a stroke can be determined by calculating the sum of the distances between consecutive points of the stroke comprising "i" points:

$$L = \sum_i \sqrt{(x_i - x_{i+1})^2 + (y_i - y_{i+1})^2}$$

Figure 6:
FIG. 6 is a diagram illustrating a method for determining keyword membership in accordance with another aspect of the present invention.

For example, assume the prespecified threshold is 0.9. During the keyword membership determination process, the PDN will calculate the length of each recorded stroke having all or some of its length included within the bounding region. Then, any recorded stroke having more than 90 percent of its calculated length included within the determined bounding region will be deemed a member of the keyword. For example, as illustrated in FIG. 6, the bounding stroke "b" passes through the letter "r" in the cursive written word "over," thereby excluding a portion of the stroke representing the word "over." However, assuming that the length of the stroke representing the portion of the word "over" within the bounding region meets the specified threshold, the entire stroke representing the word "over" will be included as a keyword member. In addition, the printed word "tall" is shown with both letters "l" having a portion thereof outside the bounding region, and the strokes comprising letters "t" and "a" being fully included within the bounding region. In this instance, the strokes comprising both letters "l" will be included as keyword members assuming the specified threshold is met. This method allows the user to be careless (to some extent) when writing bounding strokes around a desired keyword, while still being able to obtain the desired results. In addition, the user may specify the threshold to meet the user's need/style.

In accordance with yet another aspect of the present invention, the keyword membership determination process can be implemented to include only those recorded strokes having a beginning, an end, or a beginning and end included within the bounding region ("start/end membership"). The "beginning" of a stroke refers to the first recorded X-Y coordinate of the stroke (i.e., the first recorded position following the "pen-down" identifier in the recorded data stream comprising the stroke). Likewise, the "end" of a stroke refers to the last recorded X-Y coordinate of the stroke (i.e., the last recorded position just before the "pen-up" identifier in the recorded data stream comprising the stroke).

During the keyword membership determination process, the PDN will initially determine which recorded strokes have all or a portion of the corresponding data stream within the bounding region. Then, any recorded stroke having a beginning, an end, or a beginning and end (depending on the system configuration) included within the determined bounding region will be deemed a member of the keyword.

Figure 7:
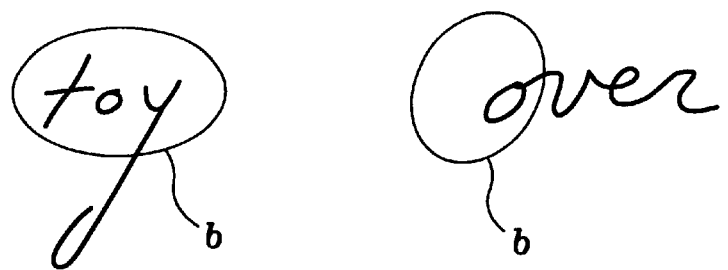
FIG. 7 is a diagram illustrating a method for determining keyword membership in accordance with another aspect of the present invention.

For instance, as illustrated in FIG. 7, the printed word "toy" is fully enclosed within bounding stroke "b" except for a portion of the tail of the letter "y" Assuming the system is configured to include as keyword members all strokes having a beginning portion within the bounding region, then the strokes comprising "t", "o" and "y" would be included as a keyword member (assuming of course that the beginning portion of the "y" stroke is included in the bounding region). Advantageously, this method allows the "y" stroke to be included as a keyword member notwithstanding that a large percentage of the "y" stroke (i.e., the tail portion) is outside the bounding region.

This method is also particularly useful for persons who write in cursive form. In particular, it enables the user to select keywords by selecting (writing bounding strokes), for instance, the beginning of a cursive word(s) instead of having to fully circle the desired word(s). For instance, as shown in FIG. 7, the stroke "over" (written in cursive form) can be easily selected by circling the letter "o" (or a small portion of it which contains the first recorded position of the stroke). In this manner, the amount of bounding strokes needed to select keywords can be minimized, thereby preventing the handwritten page from being cluttered with handwritten bounding strokes.

In accordance with another aspect of the present invention, the keyword membership determination process can be implemented by including or excluding as a keyword member a stroke having a portion that is outside of, but within a specified distance from, the bounding region, while considering the percentage (from 0 to 100%) of the stroke length which is outside the bounding region ("cost membership"). For example, if a portion of a stroke is determined to be outside the bounding region but the portion is very close to the bounding region, then the stroke may be included as the keyword member regardless of the length (or percentage) of the stroke portion which is outside the bounding region. Similarly, if a small portion of the stroke is outside the bounding region but it is determined to be significantly far from the bounding region, the stroke may not be deemed a keyword member. Accordingly, a keyword membership criterion can be defined to exclude a stroke which is partially in and partially out of the bounding region if the "cost" of the stroke portion outside of the bounding region is above some prespecified threshold. The "cost" may be defined as, for example, the average distance from the bounding region of the stroke portion outside the bounding region multiplied by the percentage of the stroke outside the bounding region.

Figure 8:
FIG. 8 is a diagram illustrating a method for determining keyword membership in accordance with another aspect of the present invention.

This method allows the keyword membership selection process to be more flexible but yet accurate enough to exclude as keyword members undesired strokes. For example, referring to FIG. 8, the stroke comprising the cursive word "toy" is shown to be entirely included within bounding region except for the cursive "t" portion of the stroke (which starts and ends inside the bounding region but which also extends outside) and the corresponding cross stroke (which runs alongside but just outside the bounding region). In this instance, the cross stroke would be included as a keyword member since it is very close to the bounding region (even though no portion of it is included within the bounding region). In addition, the stroke comprising the word "toy" (not including the cross stroke) would also be included since the "t" portion of the stroke which extends beyond the bounding region is not only relatively small compared to the portion of the stroke within the bounding region, but close to bounding region as well.

In another aspect of the present invention, an audible signal such as a beep can be used to provide information the user regarding problems that are detected during the keyword selection process. Currently the CROSSPAD beeps upon selection of a keyword. This function can be extended to various different kinds of beeps (e.g. having different tones, durations, etc.) to give the user additional information about the keyword selection process. For example, when using the conventional keyword selection process discussed above, the PDN can be configured to determine whether any recorded strokes included within the bounding box "B" but not contained within the bounding strokes "b" are included as keyword members, and then provide an designated audible signal to indicate this state to the user. In this manner, the user would have immediate feedback about the problem and would have the option of repeating the keyword selection process.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for selecting a keyword in a handwriting recording device having an electronic inking stylus and a digitizing tablet associated therewith, wherein the device records stroke data representing handwritten strokes concurrently produced on a writing medium placed over the digitizing tablet using the electronic inking stylus, the method comprising the steps of:

invoking a keyword selection mode, wherein the keyword selection mode allows a user to designate one or more recorded strokes as a reference keyword;

accepting as input, handwritten bounding strokes;

defining a bounding region as the area contained within the handwritten bounding strokes; and determining keyword membership of a recorded stroke based on a relation between the recorded stroke and the defined bounding region, wherein the step of determining keyword membership includes the steps of:

determining each stroke which is entirely contained and partially contained in the bounding region;

for each partially contained stroke, calculating a percentage of the stroke contained within the bounding region;

comparing each calculated percentage to a prespecified threshold; and selecting as keyword members the strokes that are determined to be entirely contained within the bounding region and the partially contained strokes having a calculated percentage which exceeds the prespecified threshold.

2. The method of claim 1, wherein the step of determining keyword membership includes the steps of:

selecting as keyword members strokes that are fully contained within the bounding region; and excluding as keyword members strokes that are partially contained within the bounding region.

3. The method of claim 1, wherein the prespecified threshold may be preselected by a user.

4. The method of claim 1, wherein the step of calculating a percentage of the stroke contained within the bounding region, includes the steps of:

calculating a length of the stroke and a length of the portion of the stroke contained within the bounding region; and ratioing the length of the stoke portion within the bounding region to the length of the stroke.

5. The method of claim 1, wherein the step of determining keyword membership includes the steps of including strokes that are determined to have a beginning portion within the bounding region.

6. The method of claim 1, wherein the step of determining keyword membership includes the steps of including strokes that are determined to have an ending portion within the bounding region.

7. The method of claim 1, wherein the step of determining keyword membership includes the steps of including strokes that are determined to have a beginning portion and an ending portion within the bounding area.

8. The method of claim 1, wherein the step of invoking the keyword selection mode includes the steps of:
displaying a menu of keyword selection mode options; and
selecting a keyword selection mode from the displayed menu, wherein keyword membership determination is implemented in accordance with the selected mode.

9. A method for selecting a keyword in a handwriting recording device having an electronic inking stylus and a digitizing tablet associated therewith, wherein the device records stroke data representing handwritten strokes concurrently produced on a writing medium placed over the digitizing tablet using the electronic inking stylus, the method comprising the steps of:
invoking a keyword selection mode, wherein the keyword selection mode allows a user to designate one or more recorded strokes as a reference keyword;
accepting as input, handwritten bounding strokes;
defining a bounding region as the area contained within the handwritten bounding strokes; and
determining keyword membership of a recorded stroke based on a relation between the recorded stroke and the defined bounding region,
wherein the step of determining keyword membership includes the steps of:
determining each stroke which is entirely contained and partially contained in the bounding region;
for each partially contained stroke, calculating a cost factor based on distance from the bounding region of the portion of the partially contained stroke which is outside the bounding region and the percentage of the partially contained stroke which is outside the bounding region;
comparing each calculated cost factor to a prespecified threshold; and
selecting as keyword members the strokes that are determined to be entirely contained within the bounding region and the partially contained strokes having a calculated cost factor which exceeds the prespecified threshold.

10. The method of claim 9, wherein the cost factor for a partially contained stroke is defined as the average distance from the bounding region of the stroke portion outside the bounding region multiplied by the percentage of the stroke which is outside the bounding region.

11. A program storage device readable by a machine, tangibly embodying a program of instructions executable by the machine to perform method steps for selecting a keyword in a handwriting recording device, the method steps comprising:
invoking a keyword selection mode, wherein the keyword selection mode allows a user to designate one or more recorded strokes as a reference keyword;
accepting as input, handwritten bounding strokes;
defining a bounding region as the area contained within the handwritten bounding strokes; and
determining keyword membership of a recorded stroke based on a relation between the recorded stroke and the defined bounding region,
wherein the instructions for determining keyword membership include instructions for performing the steps of:
determining each stroke which is entirely contained and partially contained in the bounding region;
for each partially contained stroke, calculating a cost factor based on distance from the bounding region of the portion of the partially contained stroke which is outside the bounding region and the percentage of the partially contained stroke which is outside the bounding region;
comparing each calculated cost factor to a prespecified threshold; and
selecting as keyword members the strokes that are determined to be entirely contained within the bounding region and the partially contained strokes having a calculated cost factor which exceeds the prespecified threshold.

12. The program storage device of claim 11, wherein the instructions for determining keyword membership include instructions for performing the steps of:
selecting as keyword members strokes that are fully contained within the bounding region; and
excluding as keyword members strokes that are partially contained within the bounding region.

13. The program storage device of claim 11, wherein the instructions for determining keyword membership include instructions for including strokes that are determined to have a beginning portion within the bounding region.

14. The program storage device of claim 11, wherein the instructions for determining keyword membership include instructions for including strokes that are determined to have an ending portion within the bounding region.

15. The program storage device of claim 11, wherein the instructions for determining keyword membership include instructions for including strokes that are determined to have a beginning portion and an ending portion within the bounding area.

16. The program storage device of claim 11, wherein the cost factor for a partially contained stroke is defined as the average distance from the bounding region of the stroke portion outside the bounding region multiplied by the percentage of the stroke which is outside the bounding region.

17. The program storage device of claim 11, wherein the instructions for invoking the keyword selection mode include instructions for performing the steps of:
displaying a menu of keyword selection mode options; and
selecting a keyword selection mode from the displayed menu, wherein keyword membership determination is implemented in accordance with the selected mode.

18. A program storage device readable by a machine, tangibly embodying a program of instructions executable by the machine to perform method steps for selecting a keyword in a handwriting recording device, the method steps comprising:
invoking a keyword selection mode, wherein the keyword selection mode allows a user to designate one or more recorded strokes as a reference keyword;
accepting as input, handwritten bounding strokes;
defining a bounding region as the area contained within the handwritten bounding strokes; and determining keyword membership of a recorded stroke based on a relation between the recorded stroke and the defined bounding region, wherein the instructions for determining keyword membership include instructions for performing the steps of:

determining each stroke which is entirely contained and partially contained in the bounding region;

for each partially contained stroke, calculating a percentage of the stroke contained within the bounding region, comparing each calculated percentage to a prespecified threshold; and selecting as keyword members the strokes that are determined to be entirely contained within the bounding region and the partially contained strokes having a calculated percentage which exceeds the prespecified threshold.

19. The program storage device of claim 18, wherein the prespecified threshold may be preselected by a user.

20. The program storage device of claim 18, wherein the instructions for calculating a percentage of the stroke contained within the bounding region include instructions for performing the steps of:

calculating a length of the stroke and a length of the portion of the stroke contained within the bounding region; and ratioing the length of the stroke portion within the bounding region to the length of the stroke.

* * * * *